United States Patent
Brucknell et al.

(10) Patent No.: US 8,989,132 B2
(45) Date of Patent: Mar. 24, 2015

(54) METHOD OF EXCHANGING DATA BETWEEN A BASE STATION AND A MOBILE STATION

(71) Applicant: Koninklijke Philips N.V., Eindhoven (NL)

(72) Inventors: Paul Brucknell, Brighton (GB); Matthew P. J. Baker, Canterbury (GB); Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/247,283

(22) Filed: Apr. 8, 2014

(65) Prior Publication Data

US 2014/0219215 A1   Aug. 7, 2014

Related U.S. Application Data

(63) Continuation of application No. 12/810,520, filed as application No. PCT/IB2008/055526 on Dec. 24, 2008, now Pat. No. 8,737,322.

(30) Foreign Application Priority Data

Jan. 3, 2008   (EP) ..................................... 08300005

(51) Int. Cl.
*H04W 72/04*   (2009.01)
*H04L 1/08*    (2006.01)
(Continued)

(52) U.S. Cl.
CPC ............... *H04L 1/08* (2013.01); *H04L 1/1893* (2013.01); *H04L 1/1896* (2013.01); *H04L 1/1861* (2013.01); *H04L 5/0055* (2013.01); *H04W 74/085* (2013.01); *H04W 28/04* (2013.01); *H04W 72/0406* (2013.01); *H04W 72/04* (2013.01)
USPC .......................................... 370/329; 455/450

(58) Field of Classification Search
None
See application file for complete search history.

(56) References Cited

U.S. PATENT DOCUMENTS 8,169,957 B2 *  5/2012  Damnjanovic ................ 370/329
8,532,010 B2    9/2013  Lee
(Continued)

FOREIGN PATENT DOCUMENTS

EP       1830593 A1      9/2007
WO   2007148881 A2     12/2007

OTHER PUBLICATIONS

Philips, NXP Semiconductors, "Control of E-UTRAN UL Scheduling", 3GPP Draft, R2-074995, Mobile Competence Center, Oct. 30, 2007, 4 Pages.
(Continued)

*Primary Examiner* — Bunjob Jaroenchonwanit

(57) ABSTRACT

The present invention relates to a method of exchanging data between a first station and a second station, said data being exchanged in packets. Said method comprises the steps of:
  receiving a packet from the second station;
  decoding said packet;
  determining whether to transmit to the second station a resource allocation message on a signalling channel;
  if a said resource allocation message is transmitted, further transmitting to the second station a first indicator signal on an indicator channel;
  if both the decoding has not been successful and the said resource allocation message is not transmitted, transmitting to the second station a second indicator signal on the indicator channel.

9 Claims, 8 Drawing Sheets

(51) Int. Cl.
*H04L 1/18* (2006.01)
*H04L 5/00* (2006.01)
*H04W 74/08* (2009.01)
*H04W 28/04* (2009.01)

(56) References Cited

U.S. PATENT DOCUMENTS

| | | | |
|---|---|---|---|
| 2003/0131299 A1* | 7/2003 | Ahn et al. | 714/748 |
| 2003/0202500 A1* | 10/2003 | Ha et al. | 370/342 |
| 2004/0258096 A1* | 12/2004 | Yoon et al. | 370/498 |
| 2005/0163161 A1* | 7/2005 | Wei et al. | 370/469 |
| 2005/0243855 A1* | 11/2005 | Dominique et al. | 370/441 |
| 2008/0232284 A1* | 9/2008 | Dalsgaard et al. | 370/310 |
| 2009/0046789 A1* | 2/2009 | Xu et al. | 375/260 |
| 2009/0073958 A1* | 3/2009 | Xu | 370/352 |
| 2009/0074090 A1* | 3/2009 | Xu et al. | 375/260 |
| 2009/0088148 A1* | 4/2009 | Chung et al. | 455/423 |
| 2009/0103562 A1* | 4/2009 | Frederiksen et al. | 370/468 |
| 2009/0136034 A1* | 5/2009 | Gaal et al. | 380/268 |
| 2009/0147743 A1* | 6/2009 | Parkvall et al. | 370/329 |
| 2009/0161618 A1* | 6/2009 | Johansson et al. | 370/329 |
| 2009/0168731 A1* | 7/2009 | Zhang et al. | 370/336 |
| 2010/0002638 A1* | 1/2010 | Park et al. | 370/329 |
| 2010/0103814 A1* | 4/2010 | Chun et al. | 370/225 |
| 2010/0118787 A1* | 5/2010 | Yano et al. | 370/328 |
| 2010/0118796 A1* | 5/2010 | Yi et al. | 370/329 |
| 2010/0118800 A1* | 5/2010 | Kim et al. | 370/329 |
| 2010/0189022 A1* | 7/2010 | Pelletier et al. | 370/311 |
| 2010/0215004 A1* | 8/2010 | Yoo | 370/329 |
| 2010/0222055 A1* | 9/2010 | Cho et al. | 455/434 |
| 2010/0265906 A1* | 10/2010 | Bucknell et al. | 370/329 |
| 2010/0272035 A1* | 10/2010 | Park et al. | 370/329 |
| 2010/0311411 A1* | 12/2010 | Lindbom et al. | 455/424 |
| 2010/0323745 A1* | 12/2010 | Chen et al. | 455/522 |
| 2011/0010598 A1* | 1/2011 | Wang et al. | 714/748 |
| 2011/0075621 A1* | 3/2011 | Sung et al. | 370/329 |
| 2011/0083066 A1* | 4/2011 | Chung et al. | 714/807 |
| 2011/0170499 A1* | 7/2011 | Nayeb Nazar et al. | 370/329 |
| 2011/0182247 A1* | 7/2011 | Chun et al. | 370/329 |
| 2011/0194500 A1* | 8/2011 | Kim et al. | 370/328 |
| 2011/0268078 A1* | 11/2011 | Ahn et al. | 370/329 |
| 2011/0280193 A1* | 11/2011 | Lindh et al. | 370/329 |

OTHER PUBLICATIONS

Panasonic, "UL HARQ Behaviour With Dynamic Adaptive/Non-Adaptive Operation", 3GPP TSG-RAN WG2 Meeting #60, R2-074854, Nov. 9, 2007, 4 Pages.

Nokia Corporation, "UL HARQ and Phichi" 3GPP TSG-RAN WGA2 Meeting #60, R2-074671, Nov. 5-9, 3 Pages.

"Evolved Universal Terrestrial Radio Access (E-UTRA)", Medium Access Control (MAC) Protocol Specification (3GPP TS 36.321 Version 8.2.0 Release 8), Nov. 2008, 35 Page Document.

"Universal Mobile Telecommunications System (UMTS); Evolved Universal Terrestrial Radio Access (E-UTRA) and Evolved Universal Terrestrial Radio Access (E-UTRAN)" Overall Description; Stage 2 (3GPP TS 36.300 Version 8.1.0 Release 8), Jun. 2007 108 Page Document.

* cited by examiner

METHOD OF EXCHANGING DATA BETWEEN A BASE STATION AND A MOBILE STATION

This application claims, as a continuation pursuant to 35 USC 120, priority to, and the benefit of the earlier filing date of, that patent application entitled "Method Of Exchanging Data Between A Base Station And A Mobile Station," filed on Jun. 25, 2010, and afforded Ser. No. 12/810,520, which is a national stage filing of that patent application filed on Dec. 24, 2008 and afforded serial number PCT/IB2008/055526, which claimed the benefit of the earlier filing date of that patent application entitled filed on Jan. 3, 2008 in the European Patent Office and afforded serial number EP08300005.9, the contents of all of which are incorporated by reference, herein.

The invention relates to a mobile telecommunication system, and more especially to a telecommunication system according to the Universal Mobile Telecommunication System UMTS standard.

The current state of the art for Evolved Universal Terrestrial Radio Access (E-UTRA) and Evolved Universal Terrestrial Radio Access (E-UTRAN) is captured in 3GPP TS 36.300; Overall description; Stage 2. The operation of Uplink Layer 2 Hybrid Automatic Repeat Request, hereinafter referred to as HARQ, processing is described in 3GPP TS 36.321 Evolved Universal Terrestrial Radio Access (E-UTRA); Medium Access Control (MAC) protocol specification, and is summarised below:

The User Equipment, sometimes called mobile station and hereinafter referred to as UE, shall for each Transmission Time Interval, hereinafter referred to as TTI:
  if an uplink grant for this TTI has been received on the physical downlink control channel PDCCH; or
  if an uplink grant for this TTI has been received in a Random Access Response:
    indicate a valid uplink grant and the associated HARQ information to the HARQ entity for this TTI;
  else, if an uplink grant for this TTI has been configured and an uplink grant for this TTI has not been received on the PDCCH nor in a Random Access Response:
    indicate an uplink grant, valid for new transmission, and the associated HARQ information to the HARQ entity for this TTI.

Please note that the period of configured uplink grants is expressed in TTIs.

There is one HARQ entity at the UE. A number of parallel HARQ processes are used in the UE to support the HARQ entity, allowing transmissions to take place continuously while waiting for the feedback on the successful or unsuccessful reception of previous transmissions.

At a given TTI, if an uplink grant is indicated for the TTI, the HARQ entity identifies the HARQ process for which a transmission should take place. It also routes the receiver feedback (acknowledgement/negative acknowledgement ACK/NACK information) from the E-UTRAN NodeB (i.e. the base station, hereinafter referred to as eNB), relayed by the physical layer, to the appropriate HARQ process.

At the given TTI, the HARQ entity shall:
  if an uplink grant, indicating a new transmission, is indicated for this TTI:
    notify the "uplink prioritisation" entity that the TTI is available for a new transmission;
    if the "uplink prioritisation" entity indicates the need for a new transmission:
      obtain the MAC Packet Data Unit PDU to transmit from the "Multiplexing and assembly" entity;
      instruct the HARQ process corresponding to this TTI to trigger the transmission of this new payload using the identified parameters.
    else:
      flush the HARQ buffer.
  else:
    if an uplink grant, indicating a re-transmission, is indicated for this TTI; or
    if the HARQ buffer of the HARQ process corresponding to this TTI is not empty:
      instruct the HARQ process to generate a re-transmission.

Please note that adaptive retransmissions are 'sticky'; i.e., when parameters are modified for a retransmission, previous parameters no longer apply for subsequent retransmissions.

The UE receives feedback information (ACK/NACK) on the Physical Hybrid ARQ Indicator Channel, hereinafter referred to as PHICH. This information is relayed by the physical layer of the UE to the appropriate HARQ process and handled in combination with the PDCCH Uplink transmission-resource grant information as shown below.

|   | UE detects PHICH indicating the following: | UE detects PDCCH indicating the following: | UE behaviour: |
|---|---|---|---|
| 1 | ACK/NACK | Transmission | starts new transmission according to PDCCH |
| 2 | ACK/NACK | Retransmission | retransmits according to PDCCH |
| 3 | ACK | None | no retransmission keeps data in buffer or clear buffer (FFS) |
| 4 | NAK | None | non-adaptive retransmission |

Furthermore it has been agreed that if the UE receives ACK on the PHICH, and the UE detects PDCCH asking for retransmission, the UE behaviour gives precedence to the request for a retransmission and therefore the UE retransmits.

Typically, the UL grants transmitted on the PDCCH are protected by a Cycle Redundancy Check (CRC), and therefore the probability of erroneous decoding is negligible, although the probability that the UE fails to detect the PDCCH message may be as high as $10^{-2}$. The ACK/NACK transmissions on the PHICH channel are not CRC-protected and are typically transmitted with an error rate of $10^{-3}$ to $10^{-4}$.

A mobile terminal can operate by decoding PDCCH then decoding PHICH, or by decoding PHICH then PDCCH if this is required.

FIG. 1 shows the UE processing of the PDCCH and PHICH where the PDCCH is decoded first.

In more detail, the UE looks for a valid PDCCH with an UL grant. If the PDCCH has been correctly decoded, then the UE looks for ACK/NACK on PHICH. If ACK or NACK is received, then the UE looks at the Incremental Redundancy Version (IRV) indicator in the PDCCH message. The UE derives from the IRV indicator whether the eNB requires a retransmission of the previous packet or a new transmission. Then, either an adaptive retransmission of the previous packet or a new transmission is carried out. Then, a valid UL grant is sent. An adaptive retransmission uses uplink transmission resources which are indicated explicitly by the PDCCH grant and are therefore not necessarily the same as for the previous transmission.

If the PDCCH failed to be decoded, then the UE looks for ACK/NACK on PHICH. If ACK is decoded, the UE assumes the previous packet was received correctly and no further UE action is carried out. If NACK is decoded, the UE assumes the need for non-adaptive retransmission (i.e. using the same uplink transmission resources as for the previous transmission). There is a possibility of collision of uplink transmissions if there is a missed PDCCH grant, as the UE would assume that the retransmission is to be non-adaptive and therefore reuse the same uplink transmission resources as for the previous transmission whereas in fact these resources might have been reassigned to a different UE. Subsequently, a valid UL grant is sent.

FIG. 2 shows the state of the art eNB processing for the UL transmissions.

In more detail, in a first step, the eNB receives an uplink packet. Then, it decodes said uplink packet.

If the decoding has been successful, the eNB sends an ACK on the PHICH. Then it checks if the UE has more data. If this is the case, the eNB sends an uplink grant on the PDCCH; if not then the process is terminated.

If the decoding has failed, the eNB sends a NACK on the PHICH and decides if the retransmission shall be adaptive or non-adaptive. If the retransmission is to be adaptive, the eNB sends an uplink grant on the PDCCH. If the retransmission is non-adaptive, the eNB does not send an uplink grant on PDCCH.

According to the state of the art, downlink radio resources are required to send both ACK/NACK signalling in the PHICH and signalling on the PDCCH allocating the UL resource to be used.

Currently the processing of ACK and NACK signals is not necessary if a valid PDCCH with an UL grant is received and successfully decoded.

The network may therefore wish to minimise the radio resources used by not sending ACK/NACK signalling.

An object of the present invention is to improve the flexibility with which the network can signal uplink resources by allowing the UE not to have to decode the ACK/NACK signalling if the PDCCH indicates a valid UL grant.

Another object of the present invention is to reduce the risk of collision between uplink transmissions.

Another object of the present invention is to enable fast recovery in the event of a missed uplink resource grant.

According to one aspect of the present invention, the transmission of ACK indicates the presence of an uplink resource grant if the ACK/NACK signalling is sent together with PDCCH UL grants. Therefore the reception of an ACK without a valid UL grant received on the PDCCH means that the PDCCH was missed.

In accordance with an aspect of the invention, a method is proposed for exchanging data between a first station and a second station, said data being exchanged in packets, said method comprising the steps of:
  receiving a packet from the second station;
  decoding said packet;
  determining whether to transmit to the second station a resource allocation message on a signalling channel;
  if said resource allocation message is transmitted, further transmitting to the second station a first indicator signal on an indicator channel;
  if both the decoding has not been successful and the said resource allocation message is not transmitted, transmitting to the second station a second indicator signal on the indicator channel.

This invention also proposes that the network can configure the signalling to operate in different modes, whereby in one mode the UL grants are sent on the PDCCH together with the associated ACK/NACK signalling on the PHICH, while in another mode the UL grants are sent on the PDCCH without the associated ACK/NACK signalling. An advantage of the latter mode is the saving of the transmitted radio resources by not sending ACKs and NACKs when they are not needed. An advantage of the former mode is that if both the UL resource indication on the PDCCH and the ACK/NACK signalling on the PHICH are used then there will be a reduction in the collision probability in the UL. The configuration between the two modes allows the network to adapt the operation depending on the relative importance of the different advantages.

Additionally the invention allows the network to signal to the UE that it cannot use any physical resource block to transmit in, which has the advantage that unnecessary retransmissions can be avoided so that the UE saves on transmit power and the network can utilise all the radio resources for other users, which may have higher-priority data to send.

These and other aspects of the invention will be apparent from and will be elucidated with reference to the embodiments described hereinafter.

The present invention will now be described in more detail, by way of example, with reference to the accompanying drawings, wherein.

This first embodiment shows the eNB processing where ACK is used as indicator of PDCCH presence and NACK is used as an indicator of PDCCH absence which means that non-adaptiveness is required.

In more detail, in a first step, the eNB receives an uplink packet. Then, it decodes said uplink packet.

If the decoding has been successful, the eNB sends an ACK on the PHICH. Then it checks if the UE has more data. If this is the case, the eNB may send an uplink grant on the PDCCH; if not then the process is terminated. Note that the check of whether the UE has more data to transmit may have been performed at an earlier stage in the process. Note also that the eNB may decide not to send an uplink grant even if the UE does have more data to send, for example in the case when other UEs have higher-priority data to send. Therefore the decision stage "Check if UE has more data" may in some embodiments be described as "Decide whether to grant further uplink transmission resources".

If the decoding has failed, then the eNB decides if the retransmission is to be adaptive or non-adaptive. If the retransmission is to be adaptive, the eNB sends an ACK on the PHICH together with an uplink grant on the PDCCH. If the retransmission is to be non-adaptive, the eNB sends a NACK on the PHICH and does not send an uplink grant on PDCCH.

Figure 1:
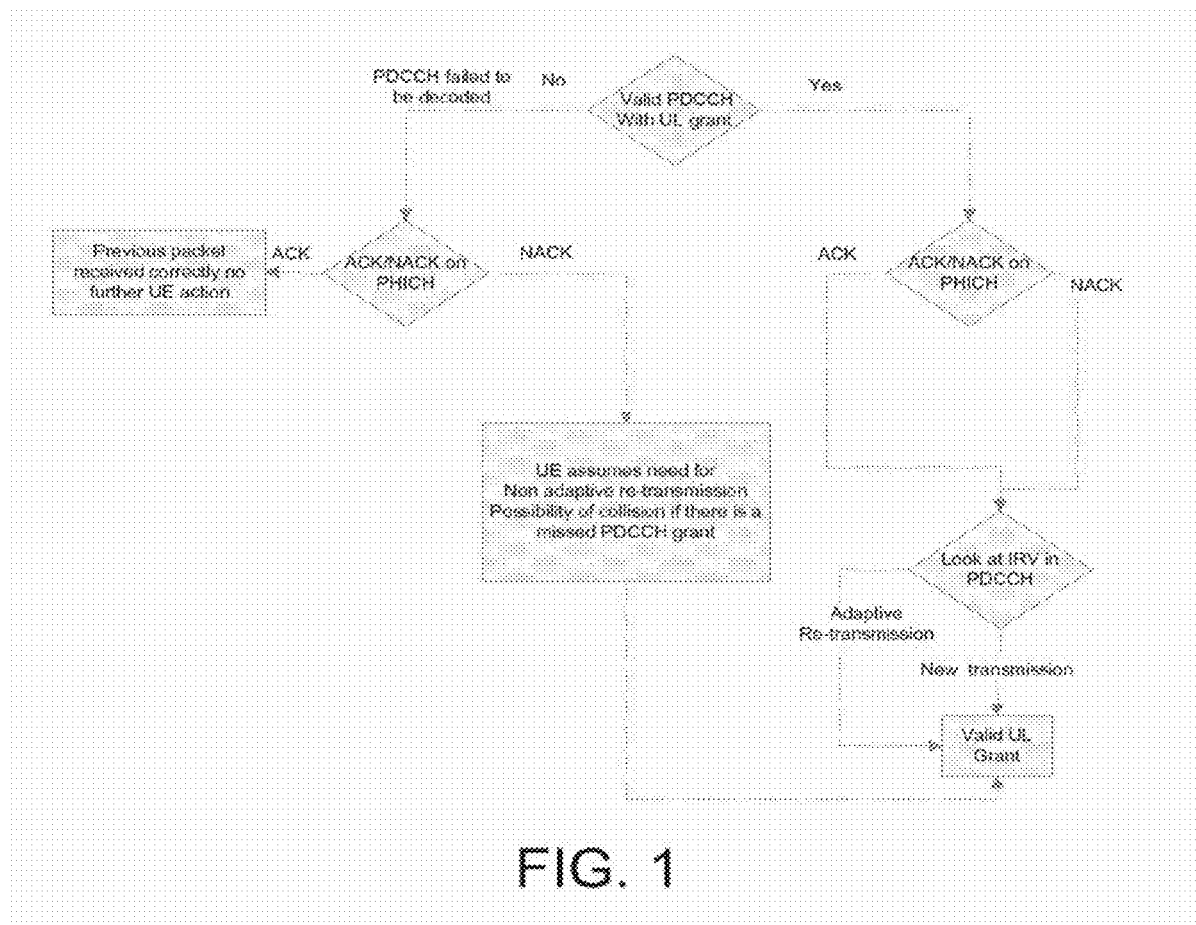
FIG. 1 shows the UE processing of the PDCCH and PHICH where the PDCCH is decoded first.
Figure 2:
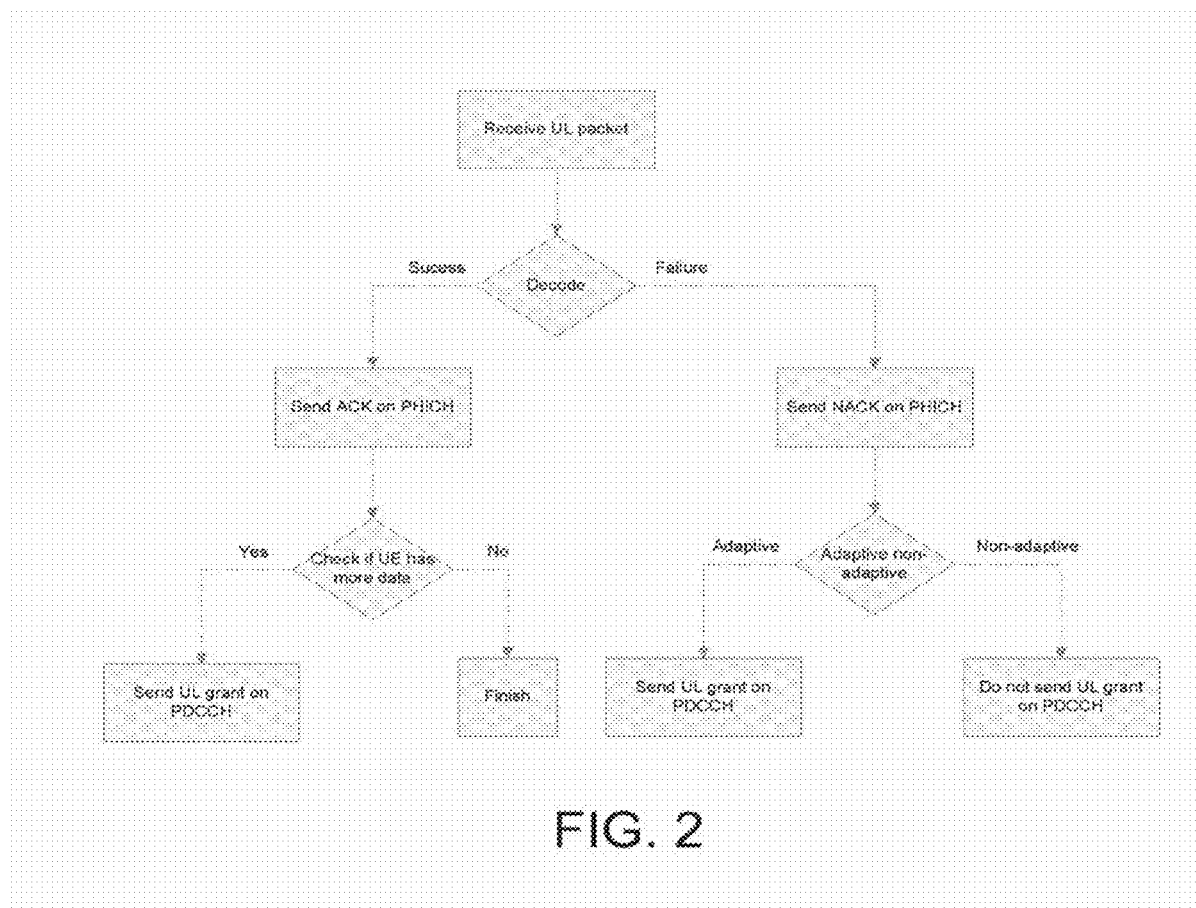
FIG. 2 shows the state of the art eNB processing for the UL transmissions.
Figure 3:
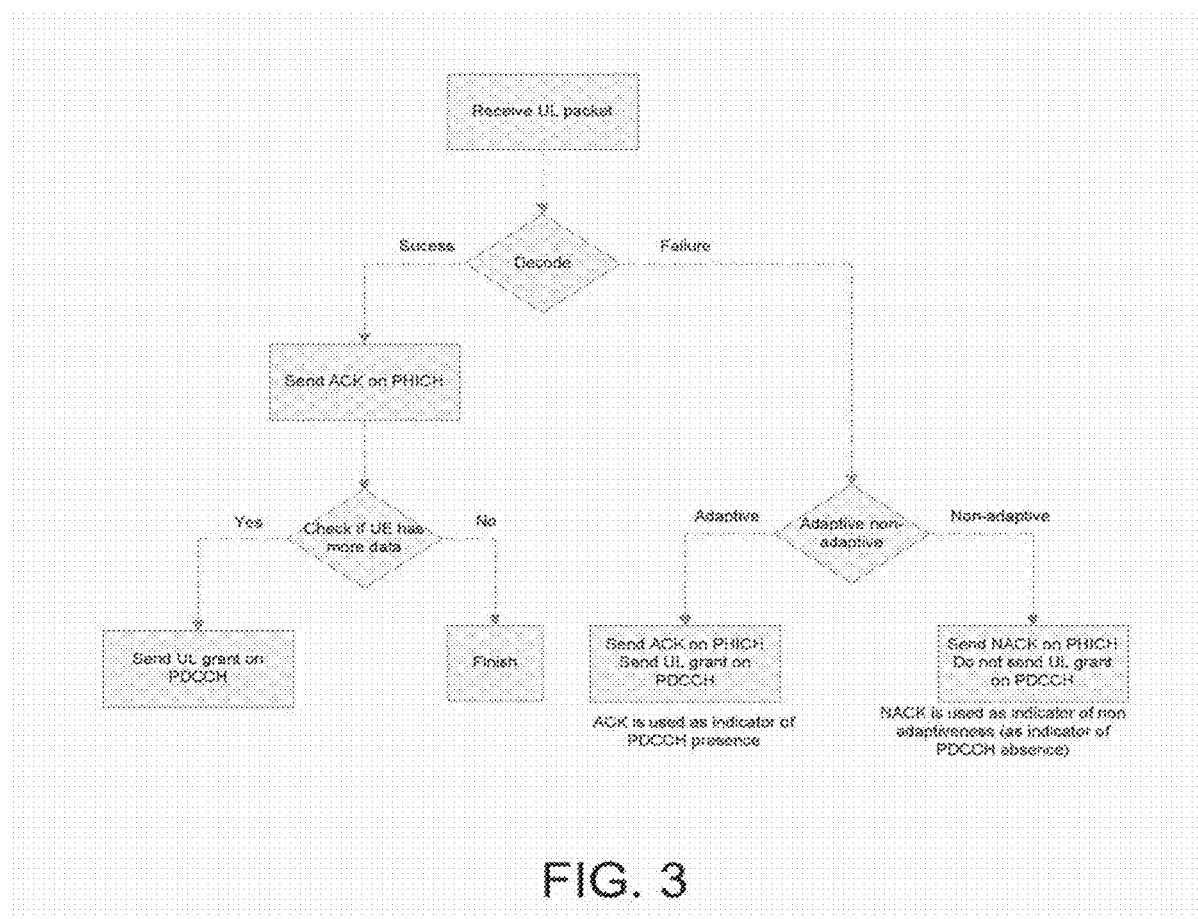
FIG. 3 shows the ACK and NACK signalling on PHICH used to signal PDCCH presence/absence.
Figure 4:
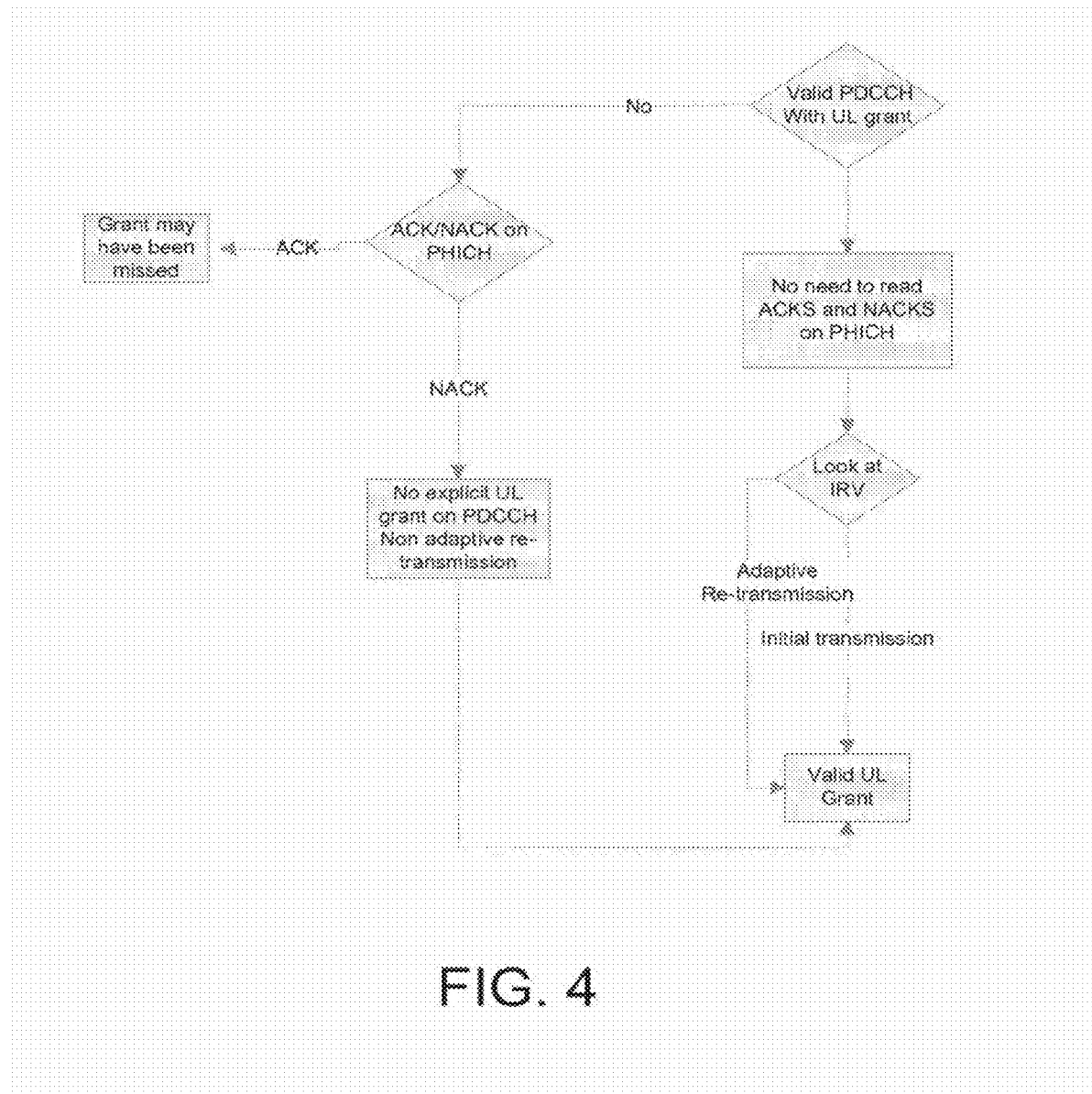
FIG. 4 shows the UE operation for the case where ACK/NACK is not read when PDCCH is sent.

FIG. 4 shows the corresponding UE operation for the eNB behaviour shown in FIG. 3. In this case, the UE does not attempt to decode ACK/NACK from the PHICH if a valid uplink grant is detected on the PDCCH.

This second embodiment shows one possible processing in the UE, where the ACK/NACK channel information is processed after the PDCCH. In this case when the ACK/NACK signal is a NACK and there was no explicit UL grant then a non-adaptive re-transmission will occur. If the there is an ACK on the PHICH but no explicit uplink grant, then this is an indication that the grant may have been missed.

In more detail, the UE looks for a valid PDCCH with an UL grant. If the PDCCH has been correctly decoded, then there is no need to read ACK/NACK on PHICH and the UE looks at IRV to determine whether the eNB requires an adaptive retransmission of the previous packet or an initial transmission. The UE then concludes that it has a valid UL grant to carry out the determined transmission.

If the PDCCH failed to be decoded, then the UE looks for ACK/NACK on PHICH. If ACK, an UL grant may have been missed. If NACK, the UE determines that there is no explicit UL grant on PDCCH and that a non-adaptive retransmission of the previous packet is required and that the UE has a valid UL to carry out the determined non-adaptive retransmission.

Figure 5:
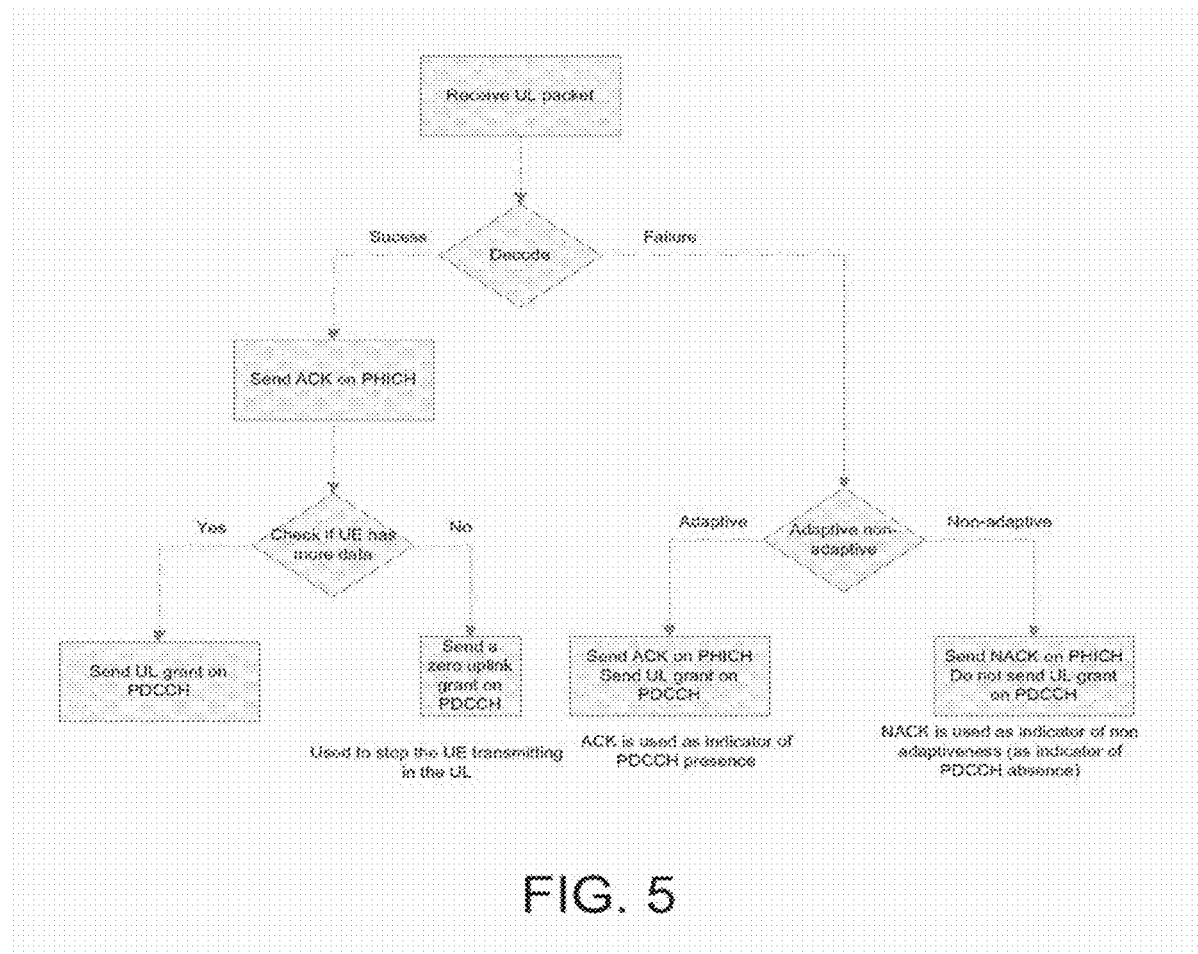
FIG. 5 shows the ACK signalling sent as an indicator of PDCCH presence.

FIG. 5 shows the ACK signalling sent as an indicator of PDCCH presence.

This third embodiment shows the eNB processing for the case when the eNB sends an ACK as an indicator of the presence of PDCCH and a NACK as an indicator of PDCCH absence. In this case there is a new signal sent to the UE to stop the UE from transmitting in the Uplink, which effectively (by for example sending a zero grant) prevents a further uplink transmission in the next corresponding TTI.

In more detail, in a first step, the eNB receives an uplink packet. Then, it decodes said uplink packet.

If the decoding has been successful, the eNB sends an ACK on the PHICH. Then it checks if the UE has more data. If this is the case, the eNB may send an uplink grant on the PDCCH; if not then the eNB sends a zero uplink grant on the PDCCH. Note that the check of whether the UE has more data to transmit may have been performed at an earlier stage in the process. Note also that the eNB may decide to send a zero uplink grant even if the UE does have more data to send, for example in the case when other UEs have higher-priority data to send. Therefore the decision stage "Check if UE has more data" may in some embodiments be described as "Decide whether to grant further uplink transmission resources".

If the decoding has failed, then the eNB decides if the retransmission is to be adaptive or non-adaptive. If the retransmission is to be adaptive, the eNB sends an ACK on the PHICH together with an uplink grant on the PDCCH. If the retransmission is to be non-adaptive, the eNB sends a NACK on the PHICH and does not send an uplink grant on PDCCH.

Figure 6:
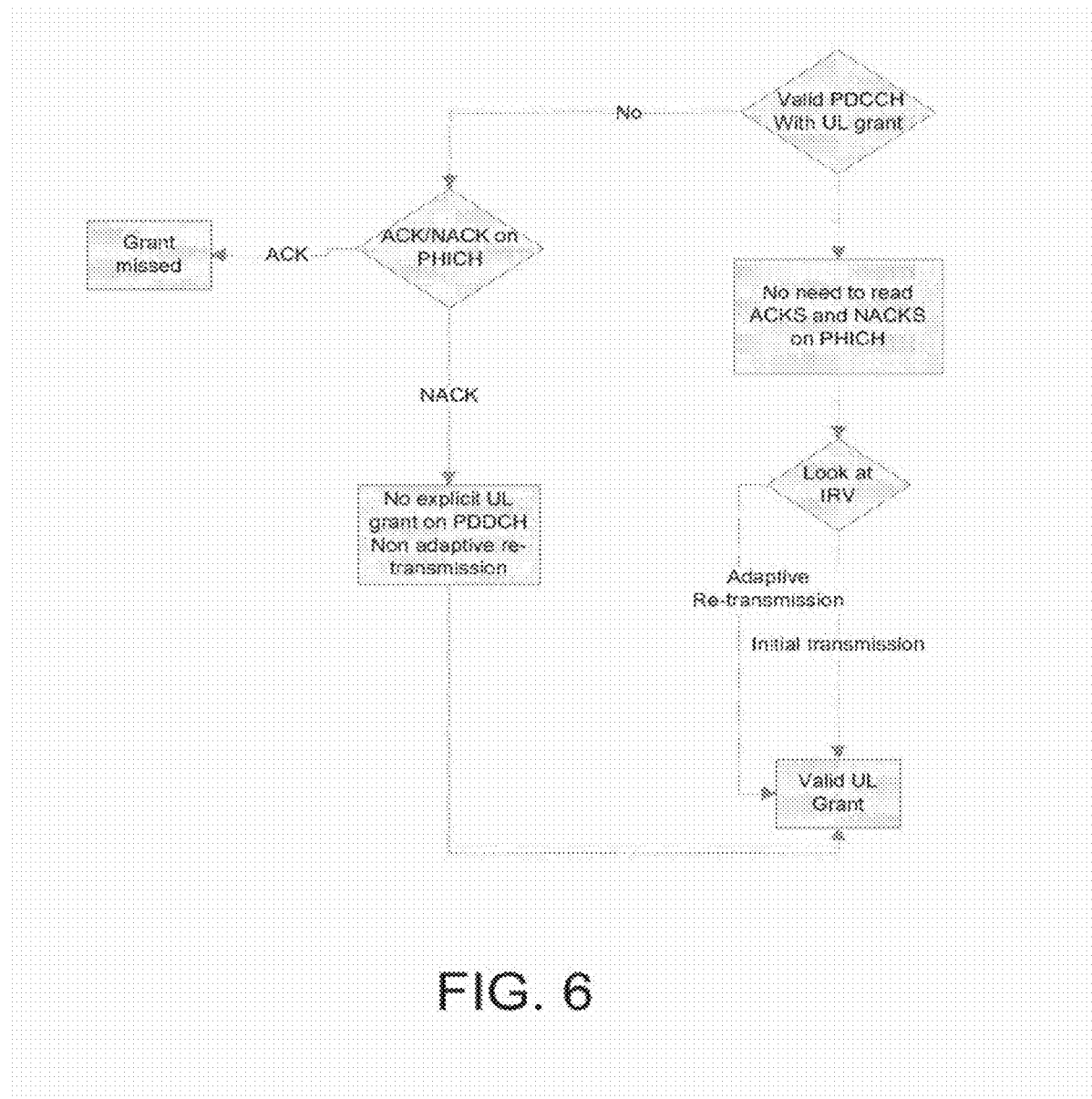
FIG. 6 shows that PHICH is not read if PDCCH grant is sent.

FIG. 6 shows the corresponding UE operation for the eNB behaviour shown in FIG. 5.

According to this fourth embodiment, in the UE the PHICH is not read if the PDCCH grant is sent.

In more detail, the UE looks for a valid PDCCH with an UL grant. If the PDCCH has been correctly decoded, then there is no need to read ACK/NACK on PHICH and the UE looks at IRV to determine whether the eNB requires an adaptive retransmission of the previous packet or an initial transmission. The UE then concludes that it has a valid UL grant to carry out the determined transmission.

If the PDCCH failed to be decoded, then the UE looks for ACK/NACK on PHICH. If ACK, the UE concludes that an UL grant has been missed. If NACK, the UE determines that there is no explicit UL grant on PDCCH and that a non-adaptive retransmission of the previous packet is required and that the UE has a valid UL grant to carry out the determined non-adaptive retransmission.

Figure 7:
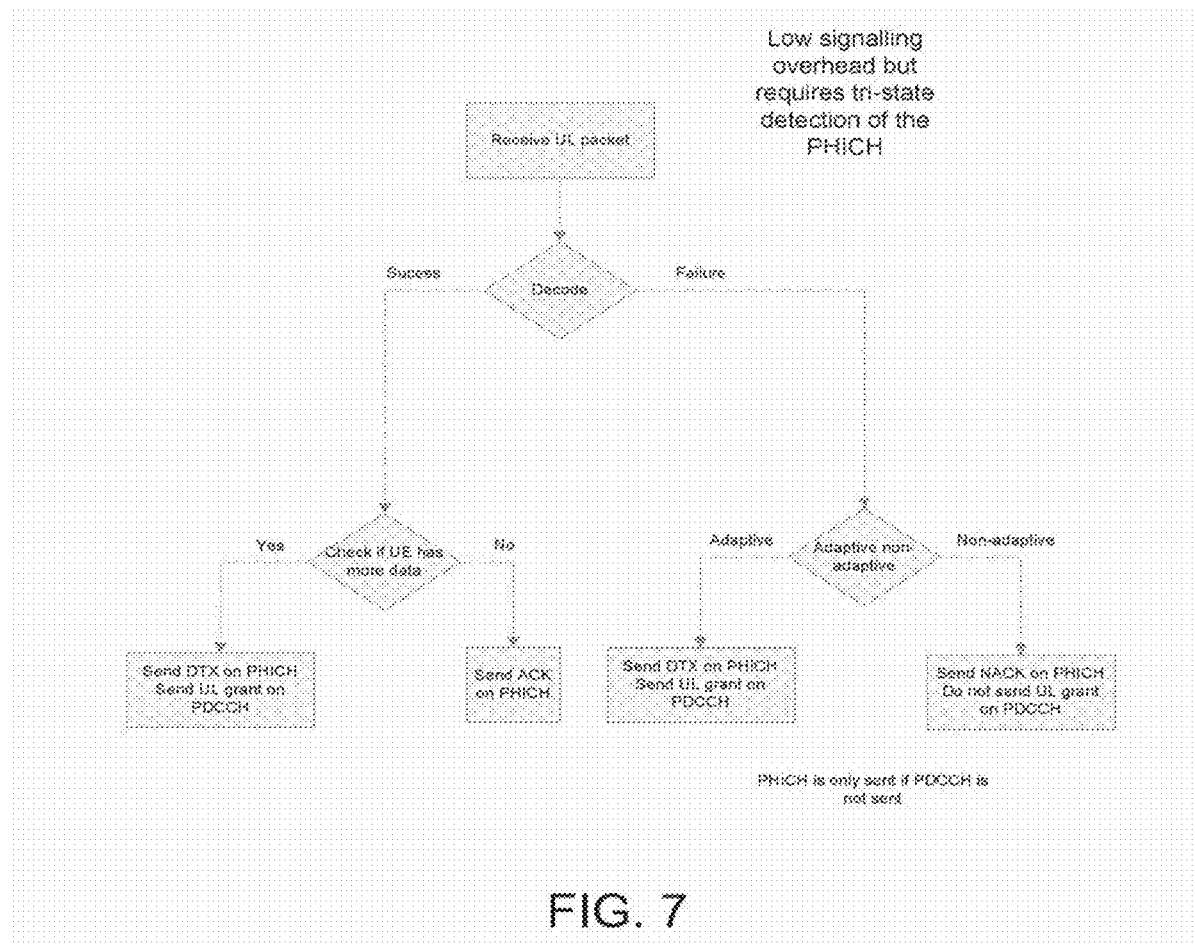
FIG. 7 shows that PHICH is sent only if PDCCH is not sent.

FIG. 7 shows an embodiment wherein the ACK/NACK on PHICH is sent only if PDCCH is not sent.

According to this fifth embodiment, in the final eNB embodiment PHICH is only sent if PDCCH is present.

The advantage of this is that there is a low signalling overhead, but tri-state detection of the PHICH (to detect Discontinuous Transmission DTX) will be required.

In more detail, in a first step, the eNB receives an uplink packet. Then, it decodes said uplink packet.

If the decoding has been successful, the eNB checks if the UE has more data. If this is the case, the eNB sends DTX (i.e. no transmission) on the PHICH and an uplink grant on the PDCCH; if not then the eNB sends an ACK on the PHICH.

If the decoding has failed, then the eNB decides if the retransmission is to be adaptive or non-adaptive. If the retransmission is to be adaptive, the eNB sends DTX on the PHICH together with an uplink grant on the PDCCH. If the retransmission is to be non-adaptive, the eNB sends a NACK on the PHICH and does not send an uplink grant on PDCCH.

Figure 8:
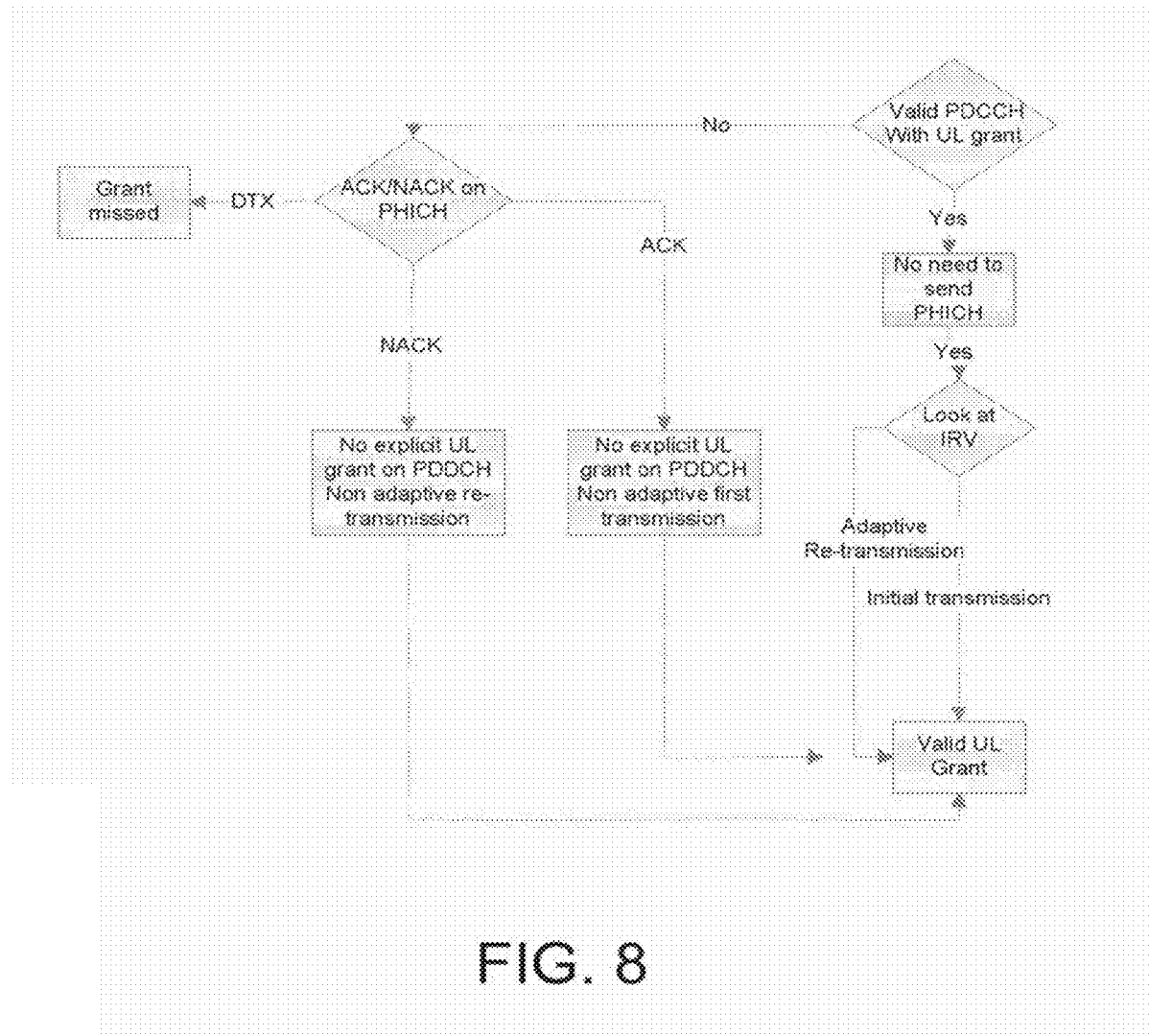
FIG. 8 shows the UE processing for tri-state ACK/NACK processing.

FIG. 8 shows the corresponding UE processing for tri-state ACK/NACK processing.

The UE processing for this sixth embodiment means that if no UL grant is received on the PDCCH and DTX is decoded on the PHICH, then a grant is assumed to have been missed, while if NACK or ACK is decoded on the PHICH a non-adaptive re-transmission or transmission will occur respectively. Note that this embodiment allows the possibility of a non-adaptive initial transmission, whereby a new packet is sent using the same uplink resources as for the previous packet transmission.

In more detail, the UE looks for a valid PDCCH with an UL grant. If the PDCCH has been correctly decoded, then there is no need to send ACK/NACK on PHICH and the UE looks at IRV to determine whether the eNB requires an adaptive retransmission of the previous packet or an initial transmission. The UE then concludes that it has a valid UL grant to carry out the determined transmission.

If the PDCCH failed to be decoded, then the UE looks for ACK/NACK on PHICH. If DTX is received from the eNB on PHICH, the UE concludes that an UL grant has been missed. If NACK, the UE determines that the eNB requires a non-adaptive retransmission of the previous packet, while if ACK, the UE determines that the eNB requires a non-adaptive first transmission of the next packet, and the UE concludes that it has a valid UL grant to carry out the determined transmission. In cases when the UE determines that it has missed or may have missed an uplink grant, in some embodiments the UE may transmit a signal to the eNB to indicate that this has been detected. This signal may for example comprise a random access message, a buffer status message, or an indicator flag. This allows the eNB the possibility to respond quickly with a further uplink grant, rather than having to send a NACK when it fails to detect an uplink packet transmission.

The invention can be implemented in mobile phones operating according to the UMTS standard. It can be more specifically applied in improving the operation of HARQ in E-UTRAN (UMTS release 8).

The invention may be implemented by means of dedicated software. A set of instructions corresponding to this software and which is loaded into a program memory causes an integrated circuit of a mobile phone to carry out the method in accordance with the embodiments of the invention.

It should be noted that the above-mentioned embodiments illustrate rather than limit the invention, and that those skilled

The invention claimed is:

1. A method of exchanging data between a first station and a second station, said data being exchanged in packets, said method comprising the steps of:
   receiving a packet from the second station;
   decoding said packet;
   determining whether said packet is decoded successfully when said packet is determined not to be decoded successfully,
   determining whether transmission resources used to transmit said packet are available for retransission of said packet; and
   performing one of:
   transmitting to the second station a first indicator signal on an indicator channel when said transmission resources are not available for retransmission of said packet and a resource allocation message containing new transmission resources to be used for a retransmission of said packet, and
   transmitting to the second station a second indicator signal on the indicator channel when said transmission resources are available for retransmission of said packet wherein said tranmission resources are used for a retransmission of said packet.

2. The method as claimed in claim 1, wherein the first indicator signal comprises a positive acknowledgement.

3. The method as claimed in claim 1, wherein the first indicator signal comprises no transmission.

4. The method as claimed in claim 1, wherein the second indicator signal comprises a negative acknowledgement.

5. The method as claimed in claim 1, wherein the resource allocation message comprises an indication of a zero-size resource allocation.

6. A base station for exchanging data with a mobile station, said data being exchanged in packets, said base station comprising:
   means for receiving a packet from the mobile station;
   means for decoding said packet;
   means for:
   determining whether said packet has not to be decoded successfully, and
   determining whether transmission resources used to transmit said packet are available for retransission of said packet; and
   performing one of:
   transmitting to the second station a first indicator signal on an indicator channel when said transmission resources are not available for retransmission of said packet and a resource allocation message containing new transmission resources to be used for a retransmission of said packet, and
   transmitting to the second station a second indicator signal on the indicator channel when said transmission resources are available for retransmission of said packet wherein said transmission resources are used for a retransmission of said packet.

7. A mobile station for exchanging data with a base station, said data being exchanged in packets, said mobile station comprising:
   means for transmitting a first packet to the base station using first transmission resources;
   means for receiving at least one of a first and a second indicator signal from the base station on an indicator channel;
   means for:
   receiving a resource allocation message on a signalling channel when said first indicator signal is received on the indicator channel, and
   retransmitting said first packet using second transmission parameters in said received resource allocation message; and
   means for retransmitting the first packet using said first transmission resources when said first indicator signal is received on the indicator channel and no resource allocation message is received on the signalling channel.

8. The mobile station as claimed in claim 7, further comprising:
   means for detecting whether detection of a said resource allocation message has failed.

9. The mobile station as claimed in claim 8, further comprising:
   means for transmitting to said base station an indication that failed detection of a said resource allocation message has been detected.

* * * * *